United States Patent [19]

Tate et al.

[11] 3,951,793

[45] Apr. 20, 1976

[54] METHOD FOR CONTROLLING SCALE

[75] Inventors: Jack F. Tate; Jim Maddox, Jr., both of Houston, Tex.

[73] Assignee: Texaco Inc., New York, N.Y.

[22] Filed: Dec. 26, 1973

[21] Appl. No.: 428,587

[52] U.S. Cl. ............................ 210/58; 252/8.55 B; 252/180
[51] Int. Cl.[2] ........................................... C02B 5/06
[58] Field of Search ............... 252/8.55 B, 8.55 D, 252/180, 551, 181; 210/58

[56] References Cited
UNITED STATES PATENTS

| | | | |
|---|---|---|---|
| 2,592,511 | 4/1952 | Chittum | 252/181 X |
| 3,265,722 | 8/1966 | Dudley | 252/551 X |
| 3,508,612 | 4/1970 | Reisberg et al. | 166/275 X |
| 3,684,720 | 8/1972 | Richardson | 252/8.55 X |
| 3,728,266 | 4/1973 | Komeda et al. | 252/551 X |
| 3,827,497 | 8/1974 | Dycus et al. | 252/8.55 X |

OTHER PUBLICATIONS

Schar et al., Article in the Journal of the American Oil Chemists' Society, Vol. 37, Sept. 1960, pp. 427–430.
Matson, Article in the Journal of the American Oil Chemists' Society, Vol. 40, Nov. 1963, pp. 636–640.

*Primary Examiner*—Herbert B. Guynn
*Attorney, Agent, or Firm*—T. H. Whaley; C. G. Ries; James F. Young

[57] ABSTRACT

Composition and method for the treatment of scale, particularly calcium and/or barium sulfate scale, using a treating composition consisting of about one part by weight of a sulfated/sulfonated polyethoxy alkyl phenol containing from about 8 to about 14 carbon atoms in the alkyl group and from about 4 to about 10 ethoxy groups, in admixture with from about 1 to 3 parts by weight of a $C_8$-$C_{14}$ alkyl benzene sulfonate, including the alkali metal and ammonium salts of one or both compounds, and mixtures thereof.

7 Claims, No Drawings

METHOD FOR CONTROLLING SCALE

This invention relates to a composition useful in treating oil and gas wells and to a method of using such composition for such treatment. More particularly this invention is directed to a composition and method useful in the prevention and/or inhibition of the build-up of undesirable inorganic mineral scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of build-up of scale deposits in aqueous systems susceptible to mineral scale formation.

The formation of objectionable scale deposits, such as calcium or barium sulfate is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore may result in the deposition of crystalline calcium sulfate which gradually builds up on the walls of the well tubing, for example, to a point where it may choke off fluid flow in the tube if remedial measures were not undertaken.

Another cause of the scale formation is attributed to the precipitation of scale material from potentially supersaturated solutions thereof. When the operating variables of temperature and pressure change adversely, or solvent is allowed to evaporate, thus concentrating the solutions, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a break-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive, and in some cases, either undesirable or mechanically impossible. Moreover, strong alkali is not effective in preventing or inhibiting the build-up of scale deposits in well tubing, production equipment and the producing strata about the bore hole.

It is, accordingly, an object of this invention to provide a method of inhibiting and/or preventing the build-up of scale deposits in gas and oil flow lines, auxiliary equipment, well tubing and the surrounding subsurface strata.

A further object is to provide a scale treating composition for use in preventing the build-up of scale deposits in the well tubing, producing equipment, the bore hole and surrounding strata.

A still further object of this invention is to provide a method of and composition for the treatment of gas and oil well tubing and the like containing sulfate scale therein to prevent and/or inhibit the build-up of further scale deposits in the tubing.

These as well as other objects are accomplished according to the present invention which comprises a scale prevention and/or inhibition composition comprising a treating composition consisting of about one part by weight of a sulfated/sulfonated polyethoxy alkyl phenol containing from about 8 to about 14 carbon atoms in the alkyl group and from about 4 to about 10 ethoxy groups, in admixture with from about 1 to 3 parts by weight of a $C_8$-$C_{14}$ alkyl benzene sulfonate, including the alkali metal and ammonium salts of one or both compounds, and mixtures thereof.

The invention also comprises a method of treating equipment susceptible to the development of scale deposits therein such as water storage tanks and the like, particularly oil field equipment, using the scale prevention composition.

Representative sulfated/sulfonated polyethoxy alkyl phenols include the octyl-, nonyl-, decyl-, undecyl-, dodecyl-, tridecyl- and tetradecyl-phenols ethoxylated with about 4 to about 10 ethoxy groups, such as the tetraethoxy-, hexaethoxy-, octaethoxy- and decaethoxy- adducts of the above alkyl phenols, the ammonium, sodium and potassium salts thereof. Particularly preferred compounds are sulfated/sulfonated - tetraethoxylated nonyl phenol, sulfated/sulfonated hexaethoxylated nonyl phenol, and sulfated/sulfonated nonyl phenol containing an average of about 9.5 ethoxy groups therein.

Representative alkyl benzene sulfonates, including the straight and branched chain alkyl group, useful in the practice of the invention include the octyl-, nonyl-, decyl-, undecyl-, dodecyl-, tridecyl- and tetradecyl-benzene sulfonates, the corresponding sodium, potassium, ammonium salts thereof as well as mixtures of one or more of said compounds. A preferred group is the $C_{10}$-$C_{14}$ alkyl benzene sulfonates and the salts thereof.

As used in the present specification and claims the expression "sulfated/sulfonated polyethoxy alkyl phenol" refers to the reaction product of a polyethoxy alkyl phenol as described hereinabove with chlorosulfonic acid or sulfur trioxide for a time period of from about 5 to about 90 minutes at a temperature in the range of from about 50° to about 60°C., using a reactant mole ratio of from about one mole of said phenol per 0.8 to 1.35 mole of said chlorosulfonic acid or sulfur trioxide.

Analysis of the resulting reaction products showed that from about 70 to 90% thereof was sulfated while the 10–30% remaining was sulfonated. Accordingly, the term sulfated/sulfonated was used to describe this reaction product. A preferred set of reaction conditions are from about 55° to about 60°C., 30 to 90 minutes in time and mole ratios of from about one mole of said phenol per 1–1.3 mole of the chlorosulfonic acid or sulfur trioxide.

In carrying out one aspect of the present invention the method thereof comprises introducing the scale prevention composition into the equipment to be protected, such as oil well tubing, in the form of an aqueous solution in an amount sufficient to provide the treating composition therein at a concentration of at least 5 ppm and preferably from about 7 to about 25 ppm by weight, and maintaining the scale treating composition in contact with the internal surfaces thereof therein for a contact time sufficient to prevent and/or inhibit the development of scale deposits or additional scale deposits therein. It is desirable to circulate the scale prevention composition through the system to provide adequate contact of the composition with the surfaces to be protected. Underground strata surrounding the well bore can be treated in a like manner, i.e. by passing the solution into said strata such as by injection of the solution down through the bore hole or production tubing, preferably under pressure.

A preferred ratio of the components of the treating composition is about one part by weight of the sulfated/sulfonated polyethoxy alkyl phenol to from about 1.25 to 2.75 parts by weight of the $C_8$-$C_{14}$ alkyl benzene sulfonate.

In general, it has been found that excellent protection against objectionable scale deposits can be obtained by maintaining the treating composition in contact with the scale for a contacting time period of from about 2 to 24 hours and preferably between about 4 to 12 hours. This contacting time period can also be advantageously used in areas containing some scale deposits such as oil field tubing to prevent or inhibit the build-up of additional scale deposits therein. In areas where heavy scale deposits are present or are likely to be encountered, the contacting time period can be extended to 24 hours or more without any harmful effects. If treatment is carried out at fairly frequent intervals with the composition of the present invention i.e. on a semiweekly or weekly basis, then shorter contacting times (e.g. averaging about 4 to 10–12 hours) can be used. Less frequent treating intervals, i.e. at about every 10 or 15 days generally necessitate corresponding longer contacting times that may average between 12 and 24 hours.

The scale prevention composition of the present invention is used in an amount sufficient to provide to the treating solution the treating composition in an amount of from about 5 ppm up to about 25–30 ppm for most uses. It has been found that excellent results are obtained at concentrations between about 7 and 20 ppm. However, the composition can also be used where higher calcium ion concentrations are found, i.e. up to about 10,000 ppm calcium. It is effective at such high calcium levels.

A more complete understanding of the invention will be obtained from the following illustrative examples.

The following procedure was used in the evaluations.

A 1000 milliliter glass beaker was provided with sufficient calcium sulfate and sodium chloride, obtained by mixing solutions of calcium chloride and sodium sulfate, to produce an aqueous concentration thereof of 10,000 ppm of calcium sulfate and 50,000 ppm of sodium chloride. A metal rotor attached to an externally provided mechanical stirring device was immersed in the test solution for a 24 hour time period. The solution was maintained at a temperature of 118°F. during the test period. At the end of the 24 hours, the rotor was removed from the solution and from the stirrer, the scale deposited thereon removed, dried and weighed. In all, several tests were conducted on each material being evaluated and the average of the tests was taken as the amount of scale deposit. The above laboratory test procedure affords good correlation between the results thereby obtained and larger scale field evaluations of scale preventing compositions.

The following tables records the results of the tests.

TABLE

| Example | Additive | Average Weight of Scale (grams) Amount of Additive (ppm) | | | | | |
|---|---|---|---|---|---|---|---|
| | | 0 | 2 | 5 | 7 | 10 | 15 | 20 |
| Blank | — | 1.90 | | | | | | |
| 1 | A[1] | | 1.70 | 0.25 | 0.0 | 0.0 | 0.0 | 0.0 |
| 2 | B[2] | | | 0.4 | | 0.0 | 0.0 | |
| 3 | C[3] | | | 0.4 | | 0.0 | | |
| 4 | D[4] | | 2.01 | 2.12 | | 0.0 | | |

[1] Additive A is a 1/1 mixture of sulfated/sulfonated tetraethoxy nonyl phenol and ammonium dodecyl benzene sulfonate.
[2] Additive B is Additive A except that the phenol contained an average of six ethoxy groups.
[3] Additive C is Additive A except that the phenol contained an average of eight ethoxy groups.
[4] Additive D is ammonium dodecyl benzene sulfonate alone.

From the data in the above table it is evident that the treating compositions of the present invention are effective scale inhibitors.

It is significant that this particular combination of compounds is effective. The sulfated/sulfonated polyethoxy alkyl phenols alone are relatively ineffective scale inhibitors and the alkyl benzene sulfonates alone are not generally effective at such very low concentrations as is clearly demonstrated by Example 4 above.

It is to be further noted that by employing the treating composition of the present invention one can obtain therewith a considerably greater tolerance to the presence of very high calcium ion concentrations in aqueous systems, i.e. on the order of 10,000 ppm or more of calcium ions. A further beneficial effect is found in the increased stability of the $C_8$-$C_{14}$ alkyl benzene sulfonate component to calcium ion concentrations above about 50 ppm, by use of the sulfated/sulfonated polyethoxy alkyl phenol therewith.

Obviously, other modifications and variations of the invention as hereinbefore set forth may be made without departing from the spirit and scope thereof, and therefore, only such limitations should be imposed as are indicated in the appended claims.

We claim:

1. A method of controlling the build-up of scale deposits selected from the group consisting of calcium sulfate scale and barium sulfate scale in an aqueous system which comprises incorporating in said system a scale treating composition consisting essentially of about one part by weight of a sulfated/sulfonated polyethoxy alkyl phenol containing from about 8 to about 14 carbon atoms in the alkyl group and from about 4 to about 10 ethoxy groups, in admixture with from about 1 to 3 parts by weight of a $C_8$-$C_{14}$ alkyl benzene sulfonate, said sulfated/sulfonated polyethoxy alkyl phenol being the reaction product of a polyethoxy alkyl phenol containing from about 8 to about 14 carbon atoms in the alkyl group and from about 4 to about 10 ethoxy groups therein with a member selected from the group consisting of chlorosulfonic acid and sulfur trioxide for a time period of from about 5 to about 90 minutes at a temperature in the range of from about 50° to about 60°C., using a reactant mole ratio of from about 1 mole of said polyethoxy alkyl phenol per 0.8 to 1.35 moles of said chlorosulfonic acid of sulfur trioxide, the resulting reaction products consisting essentially of from about 70 to 90% sulfated and from about 10 to 30% sulfonated products, each of said components of said composition being selected from the group consisting of the acid form thereof, the corresponding alkali metal and ammonium salts thereof, and mixtures of said acid and said corresponding alkali metal and ammonium salts thereof, said composition being present in said aqueous system in an amount of from about 5 to about 30 ppm by weight.

2. Method as claimed in claim 1 wherein treating composition is present in said system in an amount of from about 7 to about 25 ppm by weight.

3. Method as claimed in claim 1 wherein treating composition is composed of from about one part by weight of said sulfated/sulfonated polyethoxy alkyl phenol to from about 1.2 to 2.75 parts by weight of said $C_8$-$C_{14}$ alkyl benzene sulfonate.

4. Method as claimed in claim 1 wherein said treating composition is composed of a sulfated/sulfonated tetraethoxy nonyl phenol and ammonium dodecyl benzene sulfonate.

5. Method as claimed in claim 1 wherein said treating composition is composed of a sulfated/sulfonated hexaethoxy nonyl phenol and ammonium dodecyl benzene sulfonate.

6. Method as claimed in claim 1 wherein said treating composition is composed of sulfated/sulfonated octaethoxy nonyl phenol and ammonium dodecyl benzene sulfonate.

7. Method as claimed in claim 1 wherein said treating composition is composed of sulfated/sulfonated polyethoxy nonyl phenol wherein the average number of ethoxy groups therein is about 9.5, and ammonium dodecyl benzene sulfonate.

* * * * *